A. A. HUSEBY.
TONE ARM ADJUSTMENT FOR TALKING MACHINES.
APPLICATION FILED MAY 3, 1918.

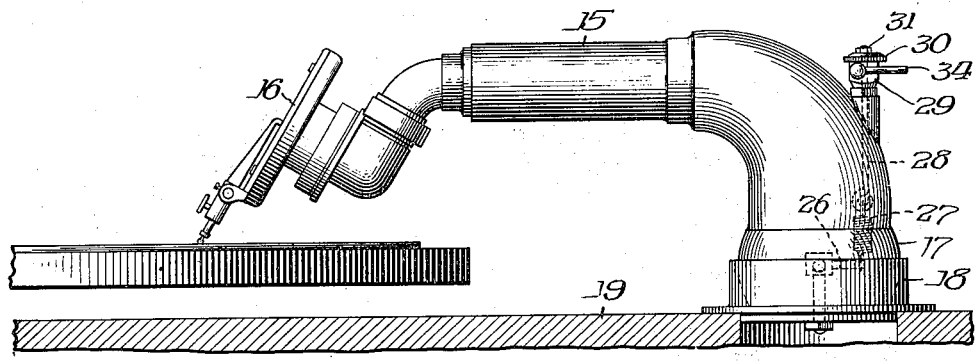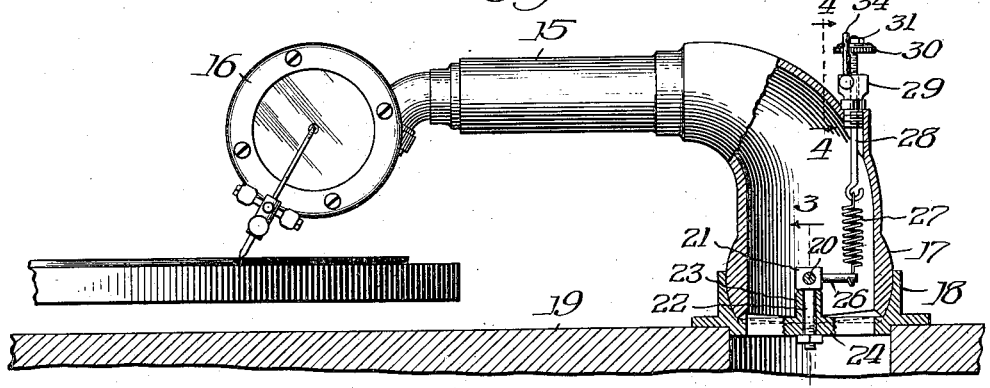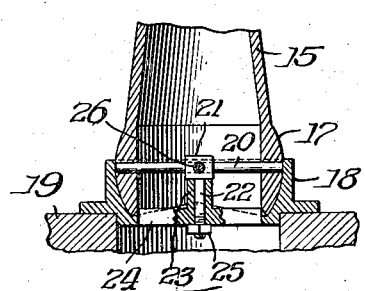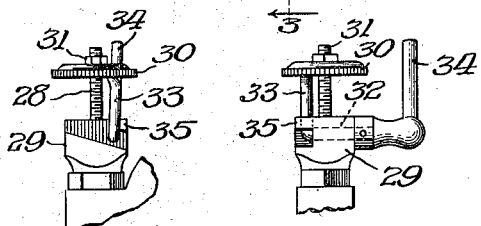

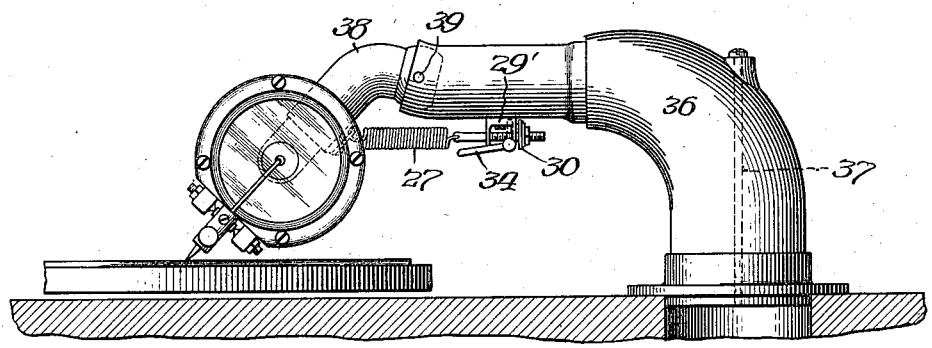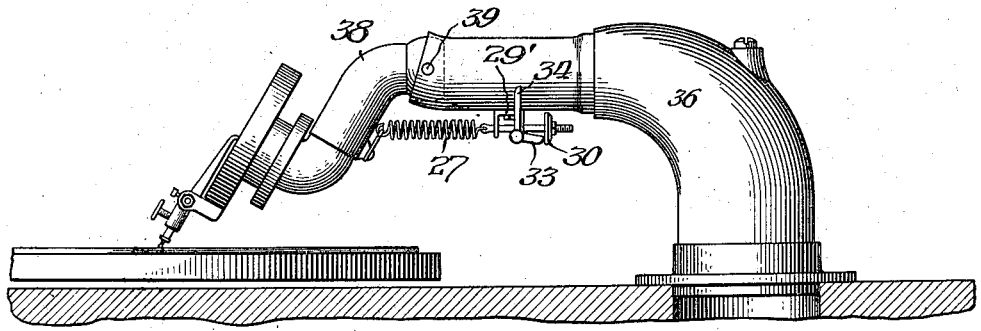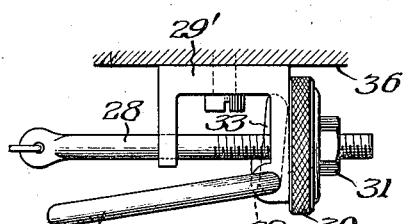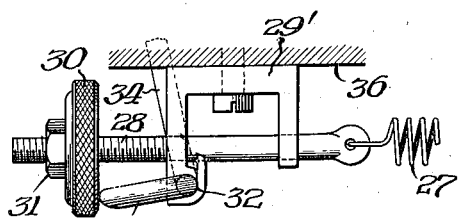

1,318,153.

Patented Oct. 7, 1919.
3 SHEETS—SHEET 3.

Witness:
Fred C. Davious

Inventor:
Albert A. Huseby,
By Pond & Wilson,
Attys.

UNITED STATES PATENT OFFICE.

ALBERT A. HUSEBY, OF CHICAGO, ILLINOIS.

TONE-ARM ADJUSTMENT FOR TALKING-MACHINES.

1,318,153.     Specification of Letters Patent.    Patented Oct. 7, 1919.

Application filed May 3, 1918. Serial No. 232,209.

*To all whom it may concern:*

Be it known that I, ALBERT A. HUSEBY, a citizen of the United States, residing at Chicago, in the county of Cook and State of Illinois, have invented certain new and useful Improvements in Tone-Arm Adjustments for Talking-Machines, of which the following is a specification.

This invention relates to improvements in tone arms for talking machines, and has reference more particularly to that type of tone arm which is equipped with means for varying the pressure that is exerted through the needle or stylus on the record during the playing operation. It is well known that when playing records such as the Victor, Columbia and Edison, which are played with a sharp pointed needle or stylus, the needle should rest lightly on the record to secure the best playing effects, as well as to reduce the wear on the record and the scratching noise that accompanies the rendition of the record. On the other hand when playing records of the Pathé type, the record grooves of which are comparatively shallow and are played with a stylus having a ball tip, the best playing effects are secured by allowing the stylus to bear more heavily on the record, since this both improves the tone and renders the stylus less liable to jump the groove.

Various tone arm constructions and accessories intended to secure these results have heretofore been proposed, involving the use of shiftable weights, or springs with tension adjusting means; but so far as I am aware few if any of these devices have proved practical or been adopted and used, on account of being undesirably complicated, or because requiring the use of a separate tool, such as a screw driver, to effect manipulation, or because lacking uniformity of result or effect when manipulated.

The primary object of the present invention is to provide a simple, inexpensive, and entirely practical device for varying the pressure of the needle or stylus on the record according to the type of record and style of needle to be used. Another object is to provide such an adjusting device not requiring the use of a separate tool to effect either its manipulation or adjustment. Still another important object is to provide such a pressure varying device which shall produce equal and uniform effects when actuated, and shall altogether eliminate the use of guess work in its manipulation.

Other objects and advantages of the invention will be apparent to those familiar with this art from the following detailed description, taken in connection with the accompanying drawings, wherein I have illustrated the principle of the invention as embodied in several slightly different mechanical forms, and wherein—

Figure 1 is a side elevation of a tone arm having my present improvement applied thereto, the figure showing the sound-box in position for playing a Pathé record. Fig. 2 is a similar figure, showing the tone arm partially in vertical section, the sound-box shifted to play a Victor record, and the pressure adjusting device tensioned so as to partially counter-balance the weight of the tone arm and sound-box. Fig. 3 is a detailed vertical section on the line 3—3 of Fig. 2. Fig. 4 is a detailed view as seen on the line 4—4 of Fig. 2, somewhat enlarged. Fig. 5 is a detailed view as seen from the left of Fig. 4.

Figs. 6 and 7 are side elevation views of a type of tone arm wherein the sound-box carrying section is pivotally jointed to the elbow section to move in a vertical plane, and showing my pressure adjusting device applied thereto. Figs. 8 and 9 are enlarged details in opposite side elevations of the spring tensioning mechanism, Fig. 8 showing the position of the parts assumed when the spring is slack, and Fig. 9 illustrating the position of the parts when the spring is tensioned. Figs. 10 and 11 are views corresponding with Figs. 6 and 7, respectively, but illustrating a specifically different form of spring tensioning mechanism.

Figure 10:
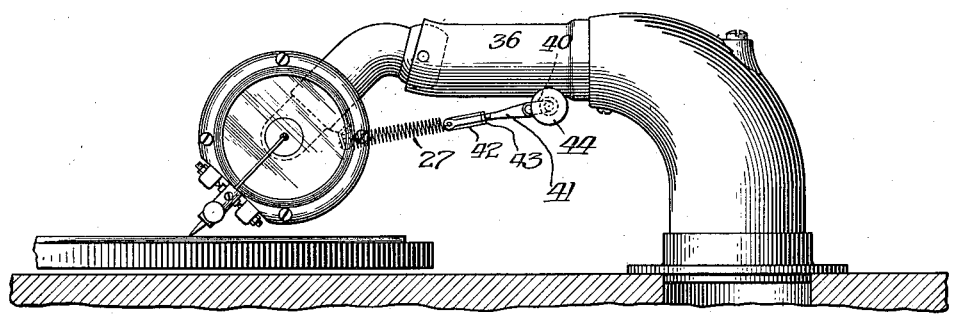

Referring first to the embodiment of the invention illustrated in Figs. 1 to 5 inclusive, I may premise that I have therein illustrated an application of the invention to a tone arm of that type which is swiveled at the lower end of its elbow on a support so as to enable the tone arm to swing horizontally and also have a limited vertical swinging movement; and in this type of tone arm practically one-half of the entire weight of the tone arm and sound-box is transmitted to the stylus, and my present invention is so applied as to partially counter-balance the weight of these parts when playing with a sharp pointed needle, while permitting the full amount of the weight of these parts that is transmitted through the stylus to be effective when playing with a blunt or ball tipped stylus.

Referring then to these figures, 15 designates as an entirety a tone arm, to the forward end of which is suitably coupled a sound box 16 that is convertible to play records of the Pathé type when occupying the position shown in Fig. 1, and records of the Victor and Columbia type when occupying the position shown in Fig. 2. The lower end of the elbow of the tone arm has a parti-spherical form 17 that fits loosely within a correspondingly shaped supporting cup or grid 18 that is rigidly secured to the usual table or platform 19 of the cabinet. The tone arm is pivoted so as to have a limited vertical swing on a pivot shaft 20, fast on which is a collar 21 carrying a depending rod 22 that is rotatable within a bearing sleeve 23 formed on a cross-bar 24 of the supporting member 18, the lower end of the rod 22 being threaded and carrying a confining nut 25.

Rigid with the collar 21 is a laterally extending arm 26 to which is anchored the lower end of a tension spring 27. To the upper end of the spring 27 is connected a threaded rod 28 that extends upwardly through a hollow plug 29 that is tapped into a vertical hole in the rear wall of the elbow of the tone arm. On the upper end of rod 28 is mounted a tappet 30 having threaded engagement with said rod so as to be adjustable up and down the latter, said tappet being secured in any adjusted position by a lock nut 31.

Rotatably mounted in the plug 29 is a horizontal rock shaft 32, on one end of which is a finger cam 33, and on the opposite end of which is an operating handle 34. A stop shoulder 35 (Fig. 5) limits the upward swing of the cam 33 at its highest point of engagement with the tappet 30.

In the operation of this device, when playing with a blunt or round tipped stylus, the sound-box 16 takes the position shown in Fig. 1, and the full gravity pressure of the free end of the tone arm is transmitted to the stylus, this being done by placing the spring-tensioning mechanism in the idle or inoperative position shown in Fig. 1 wherein the cam 33 is disengaged from the tappet 30 and the spring 27 is neutral. When it is desired to play a record with a sharp pointed needle, such as a Victor or Columbia record with the sound-box in the position shown in Fig. 2, or an Edison record with a diamond point stylus and with a sound-box in the position shown in Fig. 1, the spring 27 is tensioned by swinging the handle 34 to the vertical position which causes the cam 33 to engage and lift the tappet 30 and with it the rod 28. Since tension of the spring is applied to the tone arm on the opposite side of its axis 20 from the over-hanging portion of the tone arm and the sound-box, the gravity effect of these parts is obviously reduced, and the sharp pointed needle bears more lightly on the record. The extent to which this gravity pressure is reduced is constant for any fixed position of the tappet 30; but obviously it may be increased or reduced by adjusting the tappet 30 downwardly or upwardly on the rod 28. It will thus be seen that, when the tappet has been set in any fixed position on the rod 28, the modification of the gravity pressure of the tone arm and sound-box will be constant or uniform whenever the spring tension is applied or relieved.

In Figs. 6 and 7 I have shown a tone arm, the elbow portion 36 of which swings horizontally only on a vertical axis 37. The forward portion 38 of the tone arm is pivoted to the elbow portion 36 on a horizontal shaft 39 so that it partakes of the horizontal swinging movement of the elbow section 36 and also has a limited vertical swinging movement of its own. In this case I have applied the pressure varying mechanism between the two members or sections 38 and 36. In this case the spring 27 in anchored at one end to a lug 26' on the member 38, while its other end is connected to a spring-tensioning mechanism that is identical with that shown and described in connection with Figs. 1 to 5 inclusive, except that this spring-tensioning mechanism is mounted in a bracket 29' secured to the underside of the member 36 which, it will be observed, forms a support for the horizontally pivoted member 38, corresponding functionally in this respect to the supporting member 18 of Figs. 1 to 5. The adjustment and manipulation of the pressure varying device are the same as in Figs. 1 to 5 inclusive, but in this case the tensioning of the spring increases the pressure of the stylus on the record and consequently is employed when playing with a blunt or round pointed stylus (Fig. 7); while, when a sharp pointed needle is used, the spring is placed in slack or neutral position, as shown in Fig. 6.

Figure 11:
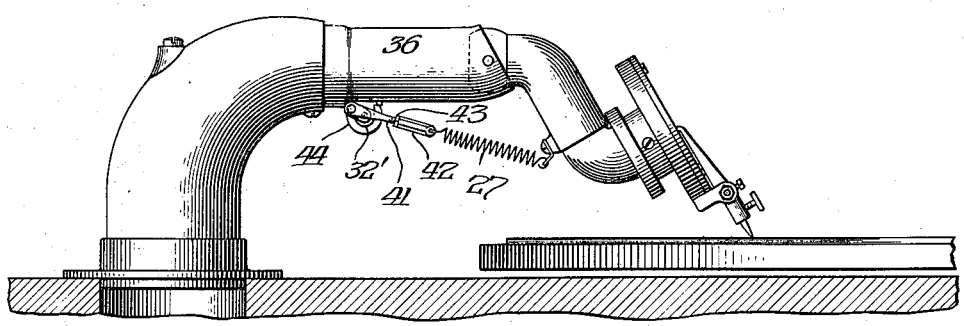
Figure 12:
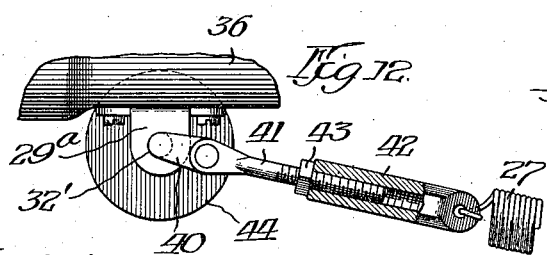
Fig. 12 is an enlarged detail view, partly in section, illustrating the adjusting means of the spring tensioning mechanism shown in Figs. 10 and 11.
Figure 13:
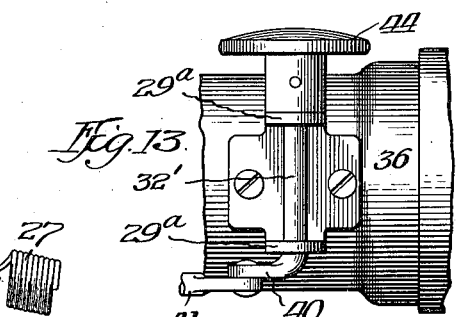
Fig. 13 is a detail bottom plan view of the spring-tensioning means shown in Figs. 10 to 12.

In Figs. 10, 11, 12 and 13 I have illustrated a modified form of a spring-tensioning mechanism applied to a tone arm of the same structure and character as that shown in Figs. 6 and 7. Here a rock-shaft 32', journaled in a bracket 29ª on the underside of the supporting section 36 of the tone arm, has fast on one end a crank arm 40 to the free end of which is pivoted a threaded rod 41 that is screwed into an internally threaded sleeve 42 and locked in any adjusted position in the latter by a lock-nut 43. The outer end of sleeve 42 is connected to the spring 27. On the other end of rock-shaft 32' is an operating knob or handle 44. In this case, when the rock-shaft is turned to tension the spring, the arm 40 is carried slightly past the dead center until its outer end strikes the underside of the tone arm, as shown in Fig. 11, so that the mechanism is automatically arrested and maintained by the pull of the spring in spring-tensioning position. A half turn of the knob or handle 44 instantly releases the tension and returns the spring to idle or neutral condition, as shown in Fig. 10. The amount of tension is easily varied by shortening or lengthening the link consisting of the rod 41 and sleeve 42 by disconnecting the spring 27 from the sleeve 42, screwing the latter inwardly or outwardly on the rod 41 and tightening the lock-nut 43.

It is believed that the character, manner of use, and advantages of this invention will be apparent to those skilled in the art from the foregoing without further explanation. I am aware that it has heretofore been proposed to employ a counter-balancing spring to reduce the pressure of the tone arm and sound-box on the record somewhat as herein shown in Figs. 1 and 2; but the spring-tensioning means which I have shown is novel and insures a constant or uniform variation each time it is actuated under any given or fixed adjustment. So far as I am aware this result has never before been accomplished in any counter-balancing device for tone arms. So far as I am aware also the application of a spring device for varying the pressure of the needle on the record to a tone arm of the character shown in Figs. 6, 7, 10 and 11, wherein the forward section of the tone arm is pivoted to swing vertically on the elbow section, and the tension of the spring increases the pressure of the stylus on the record, is new. Hence, I do not limit the invention in this application to the specific spring-tensioning means shown and described, since these may obviously be varied within the judgment and skill of the artisan or mechanic without altering the substantial character or sacrificing the advantages of the invention.

I claim:

1. The combination with a tone arm member carrying a sound-box, and a support on which said tone arm member is pivoted to swing vertically, of means for varying the pressure of the sound-box on a record, said means comprising a tension spring anchored at one end to one of said parts, a rock-shaft mounted on the other of said parts, a rod connected to the other end of said spring, a tappet on said rod, a cam on said rock-shaft engaging said tappet to shift said rod endwise and thereby tension said spring, and a handle on said rock-shaft.

2. The combination with a tone arm member carrying a sound-box, and a support on which said tone arm member is pivoted to swing vertically, of means for varying the pressure of the sound-box on a record, said means comprising a tension spring anchored at one end to one of said parts, a rock-shaft mounted on the other of said parts, a threaded rod connected to the other end of said spring, a tappet adjustable on said threaded rod, a cam on said rock-shaft engaging said tappet to shift said rod endwise and thereby tension said spring, and a handle on said rock-shaft.

3. The combination with a tone arm member carrying a sound-box, and a support on which said tone-arm member is pivoted to swing vertically, of means for varying the pressure of the sound-box on a record, said means comprising a tension spring anchored at one end to one of said parts, a rock-shaft mounted on the other of said parts, a threaded rod connected to the other end of said spring, a tappet adjustable on said threaded rod, a cam on said rock-shaft engaging said tappet to shift said rod endwise and thereby tension said spring, a stop to arrest the movement of said cam at its highest point of engagement with said tappet, and a handle on said rock-shaft.

4. The combination with a tone-arm comprising a rear vertically pivoted elbow section and a forward sound-box carrying section horizontally pivoted to said rear section, of an extensile spring anchored at one end to one of said sections, tension-adjusting means connected to the other end of said spring, and means mounted on the other tone-arm section acting through said tension-adjusting means and serving when actuated to always effect a uniform stretching of said spring.

ALBERT A. HUSEBY.